United States Patent [19]

Rayfield

[11] Patent Number: 4,608,612
[45] Date of Patent: Aug. 26, 1986

[54] CONDITION MONITORING SYSTEM FOR MAGNETIC TAPE UNIT

[76] Inventor: Earl H. Rayfield, 4649 Glanmire Dr., Virgina Beach, Va. 23464

[21] Appl. No.: 705,642

[22] Filed: Feb. 26, 1985

[51] Int. Cl.⁴ ............................................. G11B 20/20
[52] U.S. Cl. ........................................................ 360/26
[58] Field of Search ........................... 371/1; 360/26, 31

[56] References Cited

U.S. PATENT DOCUMENTS

| | | | |
|---|---|---|---|
| 3,103,000 | 9/1963 | Newman et al. | 360/26 |
| 3,508,231 | 4/1970 | Levin | 360/26 |
| 3,728,679 | 4/1973 | McIntosh | 340/146.1 |
| 3,800,280 | 3/1974 | Heffner | 340/146.1 |
| 3,839,728 | 10/1974 | Milne | 360/26 |
| 4,023,203 | 5/1977 | Baba et al. | 360/26 |
| 4,074,332 | 2/1978 | Innes | 360/26 |

OTHER PUBLICATIONS

"Adjusting Mechanical & Electrical Skew", by E. Wojtczak, IBM TDB, vol. 15, #3, 8/72.

Primary Examiner—Vincent P. Canney
Attorney, Agent, or Firm—Zalkind & Shuster

[57] ABSTRACT

The channel output signal from the center track read head of a magnetic tape unit clocks the side channel outputs of two other read heads through a logic circuit to operate a skew status indicator. The same center channel signal provides tape speed information displayed by a speed status indicator, while the amplitude condition of all channel outputs are displayed by amplitude status indicators. All indicators register a correct or acceptable condition and an incorrect condition as well as the directional deviation of the incorrect condition.

17 Claims, 8 Drawing Figures

CONDITION MONITORING SYSTEM FOR MAGNETIC TAPE UNIT

BACKGROUND OF THE INVENTION

This invention relates to the monitoring of various operating conditions of a digital magnetic tape unit or tape recorder.

A digital magnetic tape unit magnetically stores or reads information or data bits along a plurality of parallel tracks on a magnetic recording tape to which motion is imparted by a tape transport mechanism at a predetermined, constant speed. Generally such tape units have seven or nine separate track channels along which information is fed from corresponding write heads mounted as an assembly aligned perpendicular to the direction of tape travel. Data bits are recorded along the parallel tracks on the tape for simultaneous pick-up by the read heads when properly aligned. The tape unit may be adjusted to establish read head alignment as well as to set the proper tape speed and adjust signal amplitude. It is essential that proper head alignment, tape speed and signal amplitude conditions be maintained during prolonged use of the tape unit to avoid signal error and other malfunctions, especially when the tape unit is interfaced with some computer systems.

Various speed and signal amplitude monitoring devices are available per se and could be incorporated in a tape unit with considerable modification thereof both electrically and structurally. Sophisticated circuit systems are also available to both detect time displacement between channel signals, referred to as "skew" and correct associated signal error as disclosed for example in U.S. Pat. Nos. 3,728,679 and 3,800,280 to McIntosh and Heffner, respectively. Such skew detection and error correction systems often malfunction or become ineffective and do not provide the user with any notice or indication of the situation. As to "skew" caused by read head misalignment, adjustment is usually made at the factory or during installation. Such skew adjustment is periodically checked since mechanical vibrations sometimes cause the head assembly to "skew".

It is therefore an important object of the present invention to provide a reliable and inexpensive monitoring system for magnetic tape units through which development of a skew condition will be indicated.

Yet another object is to provide the aforesaid monitoring system with means to indicate other operating conditions of the tape unit such as tape speed and signal amplitude, in a manner capable of being easily and readily interpreted by the user.

SUMMARY OF THE INVENTION

In accordance with the present invention, the channel outputs from the read heads of a magnetic tape unit of a digital type are buffered and fed to peak-to-peak detectors in order to compare their amplitudes with an adjustable reference voltage source by means of window comparators. Excess signal amplitude is thereby detected as outputs of the comparators and applied to a status indicator to register a positive or negative excess amplitude condition.

One of the channel outputs from the center track head is processed by a frequency-to-voltage converter so as apply a speed data input to a window comparator for comparison with an adjustable reference speed voltage. Speed of travel of the tape above or below a preset criteria is thereby detected and registered by a speed status indicator.

The center channel output is also processed in parallel with skew indicating outputs of two side channels on opposite sides of the center channel by rectifiers and clippers to provide pulse inputs to a logic flip-flop acting as a data latch. The center channel pulse input to the flip-flop thereby clocks in a leading data input to the flip-flop to set one of two logic outputs registered in a status indicator as a "skew" condition caused by angular misalignment of the read head assembly from a position perpendicular to the direction of tape travel with the center head at the mechanical/electrical pivot point of such angular misalignment. The center channel output is accordingly utilized as a reference signal to clock operation of the logic flip-flop and thereby select the directional indication of skew error to be registered by the skew status indicator.

Each of the amplitude, speed and skew status indicators utilize two light emitting diodes, only one of which is illuminated to visually register an incorrect or bad condition. The one LED selected for illumination will depend on the direction of error. When both LEDs are illuminated, a correct or acceptable condition is registered. The amplitude indicators will therefore register excessively positive or negative amplitude peaks for each of the channel outputs. The speed indicator will register tape speed that is either too high or too low. The skew indicator will register angular misalignment of the read heads assembly in either direction depending on which one of the two LED indicators is illuminated. Correct signal amplitude, tape speed or head alignment will be registered by illumination of both LEDs in each of the status indicators.

BRIEF DESCRIPTION OF DRAWING FIGURES

DETAILED DESCRIPTION OF PREFERRED EMBODIMENT

Figure 1:
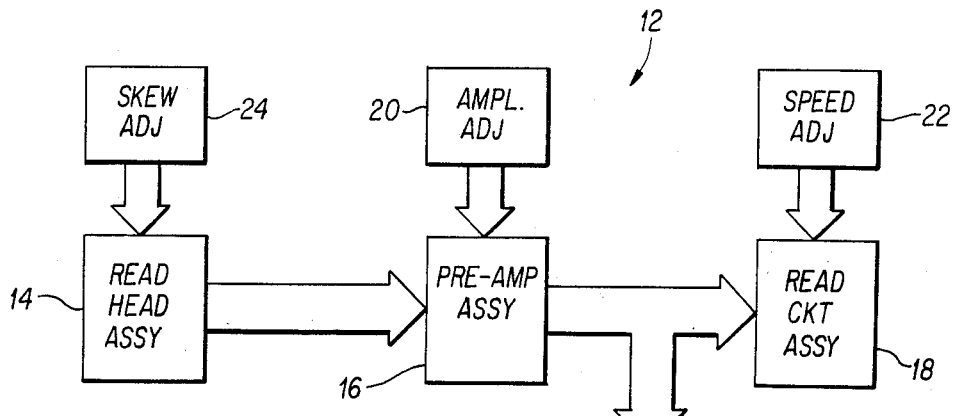
FIG. 1 is a block diagram illustrating an arrangement with which the system of the present invention is associated.

Referring now to the drawings in detail, FIG. 1 schematically illustrates the adjustment monitor system of the present invention, generally referred to by reference numeral 10 in association with a typical magnetic tape unit generally referred to by reference numeral 12. Only those portions of the unit 12 with which system 10 cooperates is depicted in FIG. 1, including the read head assembly 14 from which information is fed along a plurality of data channels through a pre-amplifier assembly 16 to a read circuit assembly 18. The amplitude of the output signals fed to the read circuit assembly 18 is adjusted by means of an amplitude adjustment control 20 associated with the preamplifier assembly 16 as shown, while the travel speed of the tape transport is adjusted by means of a speed adjustment control 22 associated with the read circuit assembly 18. The output signals fed to the read circuits 18 are also fed in parallel to the system 10 through which signal amplitude and tape speed are monitored. System 10 also monitors the angular alignment of the read head assembly 14, relative to the direction or path of travel of the magnetic tape, such angular alignment being adjustable by means of a skew adjustment screw device 24 as diagrammed in FIG. 1.

Figure 2:
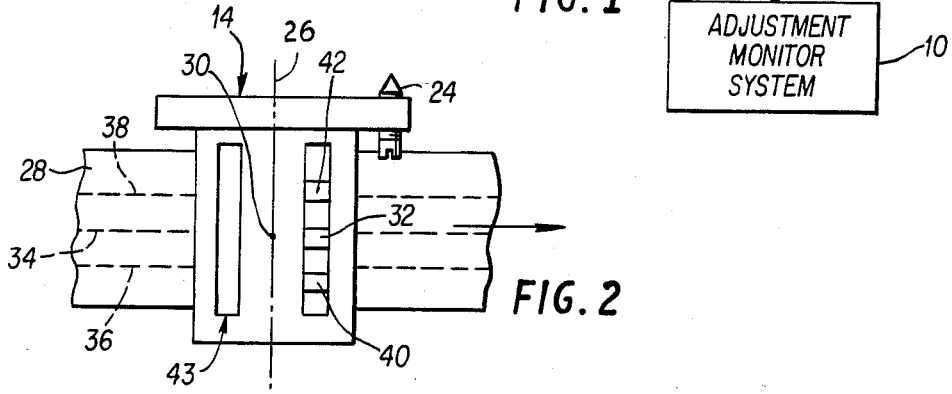
FIG. 2 is a simplified top plan view of a head assembly and an underlying, multi-track magnetic tape in motion.

Angular alignment is illustrated in FIG. 2, showing the head assembly 14 aligned along an axis 26 perpendicular to the direction of travel of tape 28 along its longitudinal axis extending through a center head 32 of the read heads and intersecting axis 26 at a pivot point 30 of the head assembly 14 about which the head assembly is angularly adjustable by means of the adjustment screw device 24. When the head assembly is misaligned or skewed, its axis 26 will deviate from the perpendicular relationship. As a result of such "skew", signals picked up from parallel tracks 34, 36 and 38 on the tape by the center read head 32 and side read heads 40 and 42 will be time displaced relative to each other dependent on such angular misalignment of the head assembly 14. The time displacement of data bit signals recorded along parallel tracks 36 and 38 on the tape 28 through write heads 43 are measured relative to the data bit signals simultaneously read through the read heads to determine the amount and direction of "skew" in accordance with the present invention.

The use of test tape in connection with skew is already known as disclosed for example in U.S. Pat. No. 3,508,231 to Levin.

For use in accordance with the present invention, a special skew master tape generally available from computer supply outlets is prepared as test tape for adjustment of read skew. Write skew may then be adjusted using the adjusted read heads as a reference to record bits on the tape. Write skew adjustment is performed either electrically through electronic delay circuitry or mechanically aligned by means of an adjustment screw device in a manner already known in the art. In the embodiment illustrated in FIG. 2, both read and write mechanical alignment functions are performed at the same time through alignment of the common head assembly 14 by means of the screw device 24 associated for example with a digital tape transport marketed by the Kennedy division of Allegheny International of Monrovia, Calif., as Model 9300.

Figure 3:
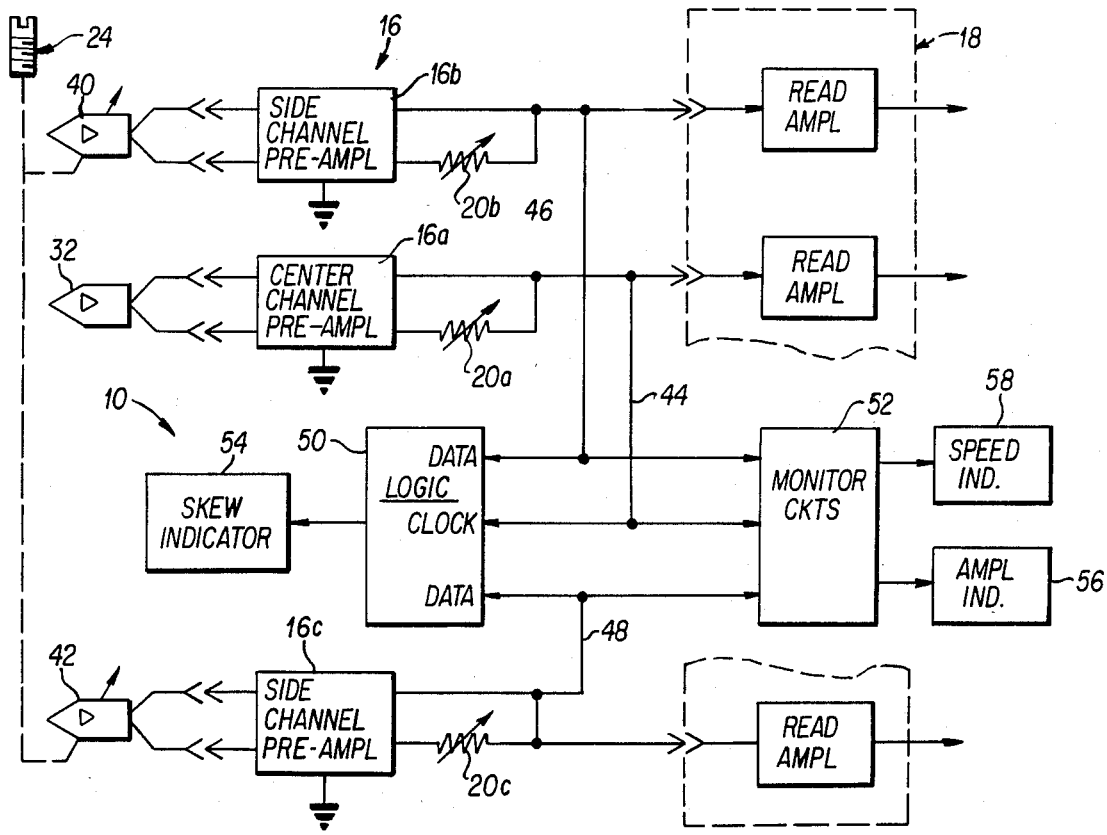
FIG. 3 is a simplified circuit diagram corresponding to the arrangement depicted in FIG. 1.

FIG. 3 illustrates in greater detail the read heads 32, 40 and 42 forming part of the head assembly 14 of a multi-channel magnetic tape unit. The heads are adjustable as aforementioned by the adjustment screw device 24 for simultaneously reading aligned data bits on the parallel tracks of the test tape prepared as aforementioned and utilized in the tape unit to monitor its operation through system 10 which is preferably mounted on a printed circuit board within the tape unit itself. Each of the read heads is connected to one of the channel pre-amplifiers 16a, 16b, 16c, etc. of the assembly 16 and each amplifier has an amplitude adjusting potentiometer 20a, 20b, 20c, etc. associated therewith as shown. The outputs of each channel preamplifier are coupled to the read amplifiers of the assembly 18. Three of the channel output lines 44, 46 and 48 as shown are also coupled to logic section 50 and signal processing section 52 of the system 10 for simultaneously transmitting test tape signals in parallel, i.e., without any differential time delay. The logic section 50 is connected to a skew indicator 54 while the section 52 is connected to amplitude and speed indicators 56 and 58 of the system 10.

Figure 4:
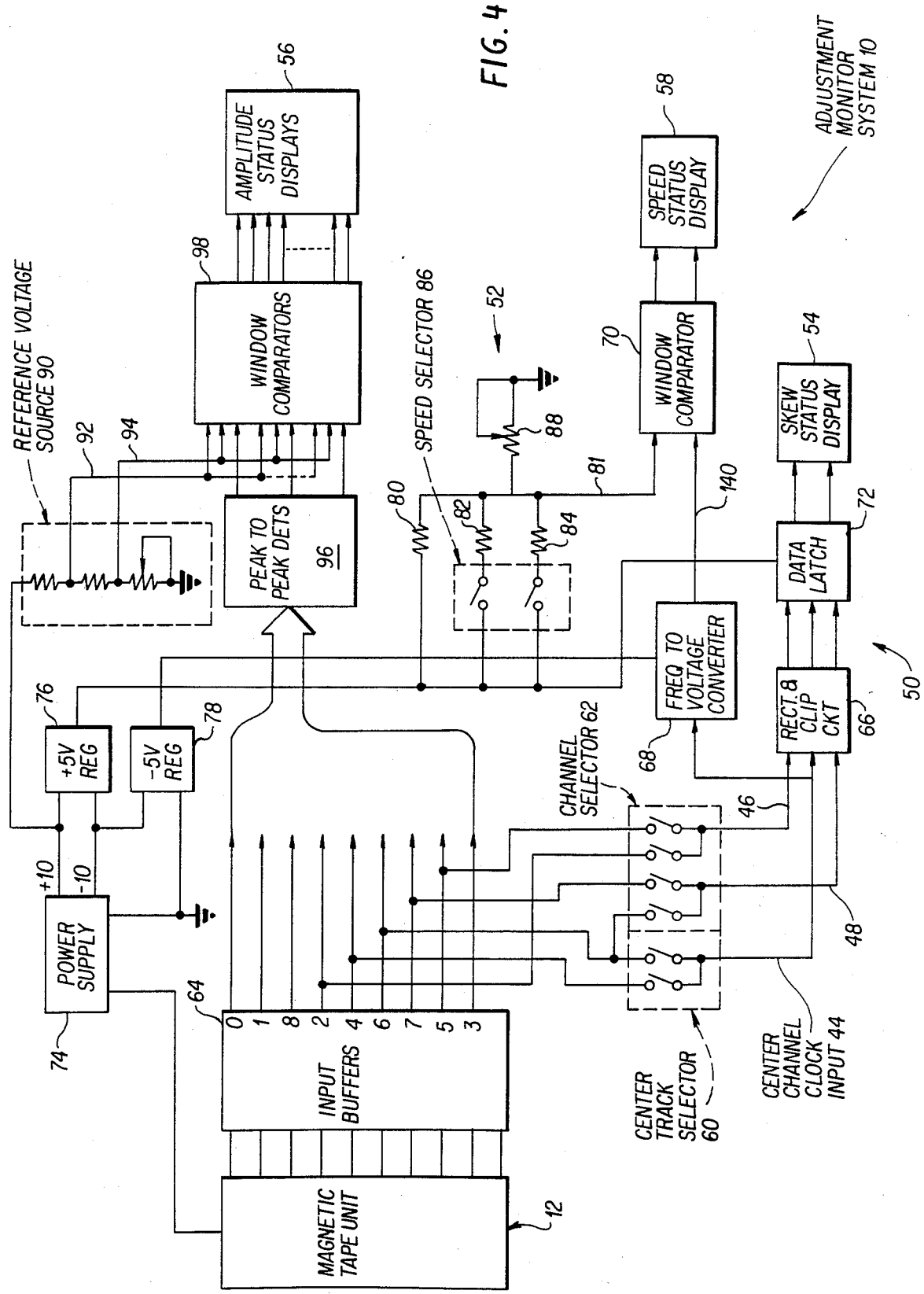
FIG. 4 is a circuit diagram illustrating the system of the present invention in accordance with one embodiment.

FIG. 4 illustrates in greater detail the system 10 connected to a standard nine track tape unit 12. Typically, the nine signal channels consist of one parity channel and eight data channels 0, 1, 2, 4, 6, 7, 5 and 3. Channel 4 corresponds to the center track adapted to be connected by selector switch 60 to the center channel output line 44 as aforementioned in connection with FIG. 3. A side channel selector switch 62 will then connect channels 5 and 7 to the two other channel output lines 46 and 48. For a seven track tape unit, channel 4 corresponds to the center track adapted to be connected by selector switch 60 to output line 44 while output lines 46 and 48 are adapted to be connected by selector switch 62 to channels 5 and 7. All of the signal channels are connected to an input buffer configuration 64 from which a corresponding number of outputs are applied to the section 52 with minimal loading of the preamplifiers 16 in the tape unit and with low signal distortion. Only three of the signal channels are simultaneously connected by the selector switches 60 and 62 to the logic section 50 through the output lines 44, 46 and 48, the channels selected being dependent on whether the magnetic tape unit is a nine-track or seven-track machine.

The channel output signals in all three lines 44, 46 and 48 are processed by rectifier and clip circuits 66 in the logic section 50 while only the output signal in line 44 is processed by a frequency-to-voltage converter 68 of section 52 to provide a speed data input to a window comparator 70 having two outputs connected to a speed status display device of indicator 58. The output signal in center channel output line 44 processed by one of the rectifier and clip circuits acts as a reference clock signal to a data latching circuit 72 to control two logic outputs applied to the display devices of skew status indicator 54 in response to the simultaneous parallel processed inputs from the other two side channel output lines 46 and 48 as aforementioned.

The power supply 74 for the tape unit 12 also provides power for the various components of monitor system 10 and through low voltage regulators 76 and 78 the converter 68 and data latch 72 are powered as shown in FIG. 4. The regulated positive voltage from regulator 76 is applied through resistor 80 in parallel with one of two resistors 82 and 84 to reference voltage line 81. The selection of resistors 82 and 84 is effected through speed selector 86 to determine the reference voltage level in line 81 in conjunction with the setting of adjustable voltage dividing resistor 88. The output of converter 68 will accordingly be compared with a preselected reference voltage applied through line 81 to comparator 70 to register excessively high or low, or correct travel speed of the tape through indicator 58.

The power supply 74 is also connected through an adjustable voltage dividing resistor network, acting as a reference voltage source 90, to reference voltage lines 92 and 94. These reference voltages are compared with inputs from peak-to-peak detectors 96 in window comparators 98. A peak-to-peak detector 96 and window comparator 98 is provided for each of the buffered signal channels to register excessive signal amplitude in an equal number of amplitude status display devices of the indicator 56.

Figure 5:
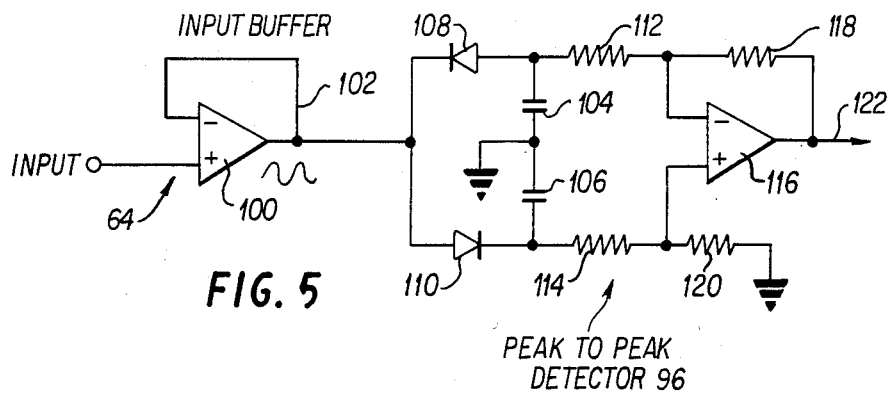
FIGS. 5, 6, 7 and 8 are electrical circuit diagrams illustrating in greater detail portions of the system depicted in FIG. 4.

FIG. 5 shows one of the input buffers 64 for a single signal channel in the form of an operational amplifier 100. The signal channel is connected to the non-inverting input of the buffer amplifier which exhibits unity gain and very high input impedance with its inverted input having a feedback connection 102. The buffering of the channel output by amplifier 100 eliminates the capacitive loading of capacitors 104 and 106, interconnected to ground, in each of the peak-to-peak detectors 96 to which the buffered channel output is applied through full wave rectifying diodes 108 and 110. The positive and negative peak voltages are accordingly stored in capacitors 104 and 106 and applied through resistors 112 and 114 to the inverting and non-inverting inputs of a differential amplifier 116 of the detector. The amplifier 116 has a feedback resistor 118 also connected to its inverting input and a grounded voltage dividing resistor 120 connected to its non-inverting input in a configuration to provide a unity gain output to one of the comparators 98 through line 122.

Figure 6:
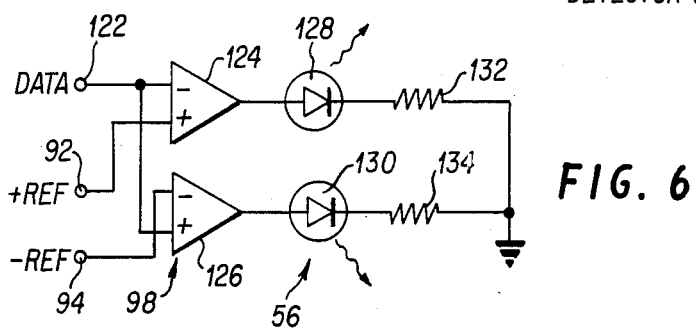

Each detector 96 is connected through its output line 122 to the inverting and non-inverting inputs, respectively, of two operational amplifiers 124 and 126 of a window comparator 98 as shown in FIG. 6. The other inputs of the amplifiers 124 and 126 are respectively connected to the reference voltage lines 92 and 94 aforementioned. An excessively negative output of a detector 96 in line 122 will accordingly produce a positive output from amplifier 124 and a negative output from amplifier 126. The polarities of the amplifier outputs are reversed when the detector input in line 122 is excessively positive.

The outputs of the comparator amplifiers 124 and 126 are respectively applied to the anodes of the light emitting diodes (LEDs) 128 and 130 of each of the status display devices 56 as shown in FIG. 6. The cathodes of the LEDs 128 and 130 are connected through resistors 132 and 134 to ground. Dependent on the polarities of the outputs from amplifiers 124 and 126 of the comparator 98, either the low amplitude indicating LED 128 or the high amplitude indicating LED 130 will be illuminated and the other extinguished. When the detector output in line 122 is between the reference voltages in lines 92 and 94, both LEDs 128 and 130 will be illuminated to indicate acceptable signal amplitude. The status indicators 56 thus signify acceptable and unacceptable signal amplitude conditions as well as the direction of error.

Figure 8:
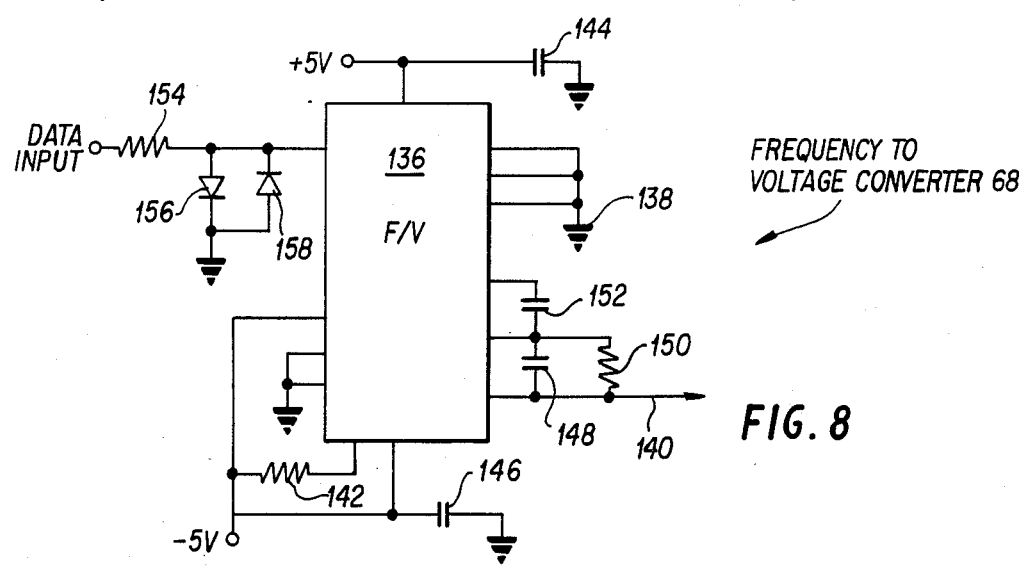

The window comparator 70 shown in FIG. 4 and the speed status display indicator 58 associated therewith are formed by the same circuit configuration as each of the window comparators 98 and associated status indicators 56 described with respect to FIG. 6, except that the single reference voltage line 81 is connected in parallel to the inverting and non-inverting reference inputs for comparison with a data input from the frequency-to-voltage converter 68 for excessive speed detection purposes. As shown in FIG. 8, a "Teledyne" integrated circuit chip 136 is configured in a frequency to voltage mode by grounding of pins at 138 to produce a speed reflecting voltage output in line 140. The low voltage regulators 76 and 78, aforementioned, are connected to the power supply pins of chip 136, to a bias resistor 142 and grounded power by-pass capacitors 144 and 146. The output pin of chip 136 connected to line 140 is connected through capacitor 148 and resistor 150 to the chip circuit for voltage output scaling and to capacitor 152 for smoothing output ripple. The output line 140 is connected to the data input of the comparator 70. The input to the chip 136 from the center channel signal line 44 is reduced in voltage by resistor 154 and clipped by diodes 156 and 158 for proper operation of chip 136 as a frequency to voltage converter.

Figure 7:
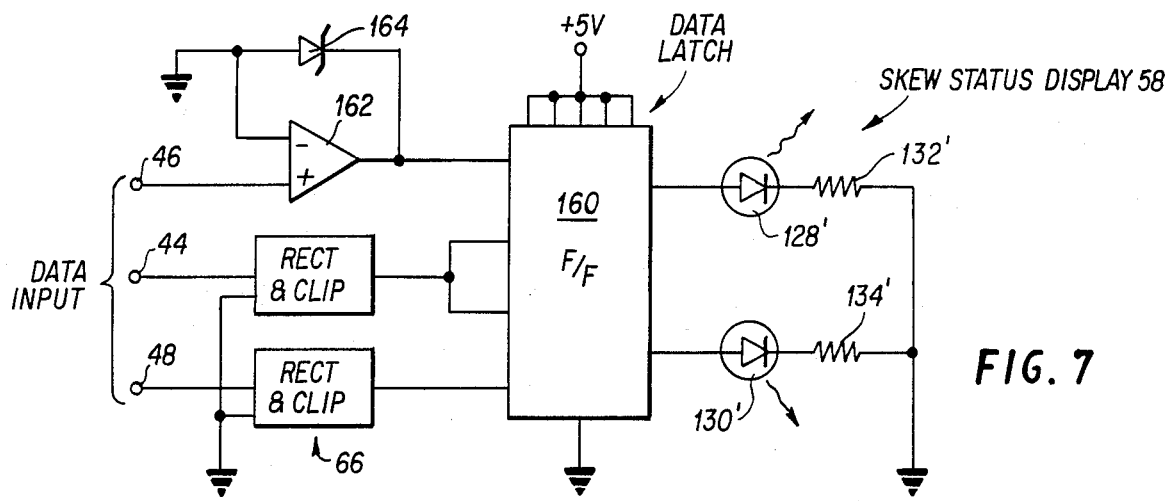

The same center channel signal line 44 is connected to one of the rectifier and clipping circuits 66 as shown in FIG. 7 to apply clock inputs to a flip-flop 160 of the data latching circuit 72. Each of the three rectifier and clipping circuits includes an operational amplifier having a non-inverting data input and an inverting feedback input connected to ground and to a feedback zener diode 164 functioning as a half-wave rectifier and clipper. Thus, rectified and clipped side channel signal pulses are applied to the data inputs of the flip-flop 160. The two logic outputs of flip-flop 160 are connected to the LEDs 128' and 130' of the status display indicator 58 which is similar in configuration to indicator 56 shown in FIG. 6.

If there is a skewed condition, the signal applied to one of the data inputs of flip-flop 160 will lead the clock signal pulse derived from the center channel signal line 44 while the other data input will lag. The leading pulse input will therefore be clocked into the flip-flop to set a logic 1 in one of the outputs of the flip-flop causing one LED 128' or 130' to light up depending on the direction of skew. The lagging input will not be clocked in so that a zero logic is set at the other output of the flip-flop to extinguish the other LED. When there is no "skew", both data inputs to the flip-flop are applied simultaneously with the clock inputs and both are clocked in to light up both LEDs 128' and 130'. Thus, the status indicator 58 will display correct and incorrect "skew" conditions as well as directional deviation when an incorrect "skew" condition is registered.

What is claimed is:

1. In combination with a magnetic tape unit having at least three read heads aligned in a direction transverse to a path of travel of a tape from which data bits are read on parallel tracks to produce corresponding outputs transmitted by separate data channels, a condition monitoring system including means connected to one of the data channels for converting the output thereof into a reference signal, logic means connected to the data channels for detecting time displacement of the outputs in the two other of the data channels relative to the reference signal in said one of the data channels and skew indicating means connected to the logic means for registering the outputs in said data channels, the improvement comprising means for selecting said two other of said data channels from from which the outputs are opposite in direction relative to the reference signal and means responsive to said detection of time displacement for limiting registration of the outputs to one of the data channels reflecting angular misalignment of the heads relative to one of the heads from which the reference signal is derived.

2. In combination with a magnetic tape unit having at least three read heads aligned in a direction transverse to a path of travel of a tape from which data bits are read on parallel tracks to produce corresponding outputs transmitted by separate data channels, a condition monitoring system including selecting means connected to the data channels for converting the output in a selected one of the data channels into a reference signal, logic means connected by the selecting means to the data channels for detecting time displacement of the outputs in at least two of the data channels relative to the reference signal in said selected one of the data channels, skew indicating means connected to the logic means for registering excessive time displacement of the outputs in said two of the data channels in opposite directions relative to the reference signal reflecting angular misalignment of the heads relative to one of the heads from which the reference signal is derived, the magnetic tape unit including means for adjusting angular alignment of the heads, amplitude of the outputs in the data channels and speed of travel of the tape, the condition monitoring system further including frequency-to-voltage converting means connected to the selecting means for generating speed signals reflecting the speed of travel of the tape relative to said one of the heads, peak-to-peak detection means connected to the data channels for converting the outputs therein into peak amplitude signals, and status indicating means connected to the signal converting means and the peak-to-peak detection means for registering excessive speed of travel of the tape and excessive amplitude of the outputs in the data channels.

3. The condition monitoring system as defined in claim 2 wherein the selecting means includes a center channel selector switch having two input terminals respectively connected to said one and another of the data channels and a single reference signal output terminal connected to the logic means, and side channel selector means connected to four of the data channels for transmitting the outputs of two of the four data channels to the logic means.

4. The system as defined in claim 3 wherein the logic means includes a data latching circuit having a clock input, two data inputs and two logic outputs, and signal processing means respectively connecting the two of the data channels to the two data inputs and said selected one of the data channels to the clock input of the data latching circuit.

5. The system as defined in claim 4 wherein said skew indicating means includes two display devices respectively connected to the two logic outputs of the data latching circuit for alternate or simultaneous energization under control of the reference signal applied to the clock input of the data latching circuit.

6. The system as defined in claim 5 wherein each of the status indicating means includes a comparator circuit having inverting and non-inverting inputs and two logic outputs, data receiving means interconnecting said inverting and non-inverting inputs, a source of reference data connected to the comparator circuit and a pair of display devices respectively connected to the two logic outputs of the comparator circuit for alternate or simultaneous energization.

7. In combination with a magnetic tape unit having at least three read heads aligned in a direction transverse to a path of travel of a tape from which data bits are read on parallel tracks to produce corresponding outputs transmitted by separate data channels, a condition monitoring system, including selecting means connected to the data channels for converting the output in a selected one of the data channels into a reference signal, logic means connected by the selecting means to the data channels for detecting time displacement of the outputs in at least two of the data channels relative to the reference signal in said selected one of the data channels and skew indicating means connected to the logic means for registering excessive time displacement of the outputs in said two of the data channels in opposite directions relative to the reference signal reflecting angular misalignment of the heads relative to one of the heads from which the reference signal is derived, the logic means including a data latching circuit having a clock input, two data inputs and two logic outputs, and signal processing means respectively connecting two of the data channels to the two data inputs and said selected one of the data channels to the clock input of the data latching circuit.

8. The system as defined in claim 7 wherein said skew indicating means includes two display devices respectively connected to the two logic outputs of the data latching circuit for alternate or simultaneous energization under control of the reference signal applied to the clock input of the data latching circuit.

9. The system as defined in claim 2 wherein each of the status indicating means includes a comparator circuit having inverting and non-inverting inputs and two logic outputs, data receiving means interconnecting said inverting and non-inverting inputs, a source of reference data connected to the comparator circuit and a pair of display devices respectively connected to the two logic outputs of the comparator circuit for alternate or simultaneous energization.

10. In combination with a magnetic tape unit having at least three read heads aligned in a direction transverse to a path of travel of a tape from which data bits are read on parallel tracks to produce corresponding outputs transmitted by separate data channels, a condition monitoring system including selecting means connected to the data channels for converting the output in a selected one of the data channels into a reference signal, logic means connected by the selecting means to the data channels for detecting time displacement of the outputs in at least two of the data channels relative to the reference signal in said selected one of the data channels and skew indicating means connected to the logic means for registering excessive time displacement of the outputs in said two of the data channels in opposite directions relative to the reference signal reflecting angular misalignment of the heads relative to one of the heads from which the reference signal is derived, the selecting means including a center channel selector switch having two input terminals respectively connected to said one and another of the data channels and a single reference signal output terminal connected to the logic means, and side channel selector means connected to four of the data channels for transmitting the outputs of two of the data channels to the logic means.

11. In combination with a signal generating unit having a plurality of data channels respectively transmitting separate outputs, a monitoring system including means connected to the data channels for converting the output in one of the data channels into a reference signal, logic means connected to the other of the data channels for processing of said outputs therefrom, and indicator means connected to the logic means for registering the processed outputs, the improvement comprising means for limiting registration of the processed outputs to those from two of said data channels and means under control of the reference signal from said one of the data channels for preventing registration of one of the processed outputs of said two of the data channels in response to time displacement between the separate outputs transmitted by the data channels, to signify directional error.

12. The system as defined in claim 11 wherein the indicator means includes at least two display devices alternately and simultaneously energized for indicating directional deviation and alignment, respectively, with respect to the separate outputs in the data channels.

13. The system as defined in claim 12 wherein the logic means includes a flip-flop having two logic outputs clocked by the reference signal, the two display devices being respectively connected to the two logic outputs of the flip-flop.

14. The system as defined in claim 13 wherein the logic means further includes means for comparing the reference signal with a selected standard.

15. The system as defined in claim 11 wherein the logic means includes a flip-flop having two logic outputs clocked by the reference signal, the two display devices being respectively connected to the two logic outputs of the flip-flop.

16. The system as defined in claim 15 wherein the logic means further includes means for comparing the reference signal with a selected standard.

17. In a device for monitoring alignment of an assembly of signal heads by observance of a plurality of data tracks on a tape with which the heads are aligned, wherein one of the signal heads is closest to a pivot point about which the assembly is mechanically adjusted, said device including separate data channels respectively connected to the signal heads, an alignment status indicator operated in response to signals transmitted thereto from the signal heads through the data channels and means rendering the indicator operative to simultaneously register the signals transmitted for indicating correct alignment of the assembly, the improvement comprising means for selecting two of the data channels through which the signals are transmitted to the indicator from corresponding signal heads on opposite sides of said one of the signal heads and means controlled by the signal transmitted from said one of the signal heads for limiting registration by the indicator to signals transmitted by one of the two data channels in response to time displacement between the transmitted signals to indicate angular direction of misalignment of the assembly relative to the pivot point.

* * * * *